United States Patent Office 2,821,502
Patented Jan. 28, 1958

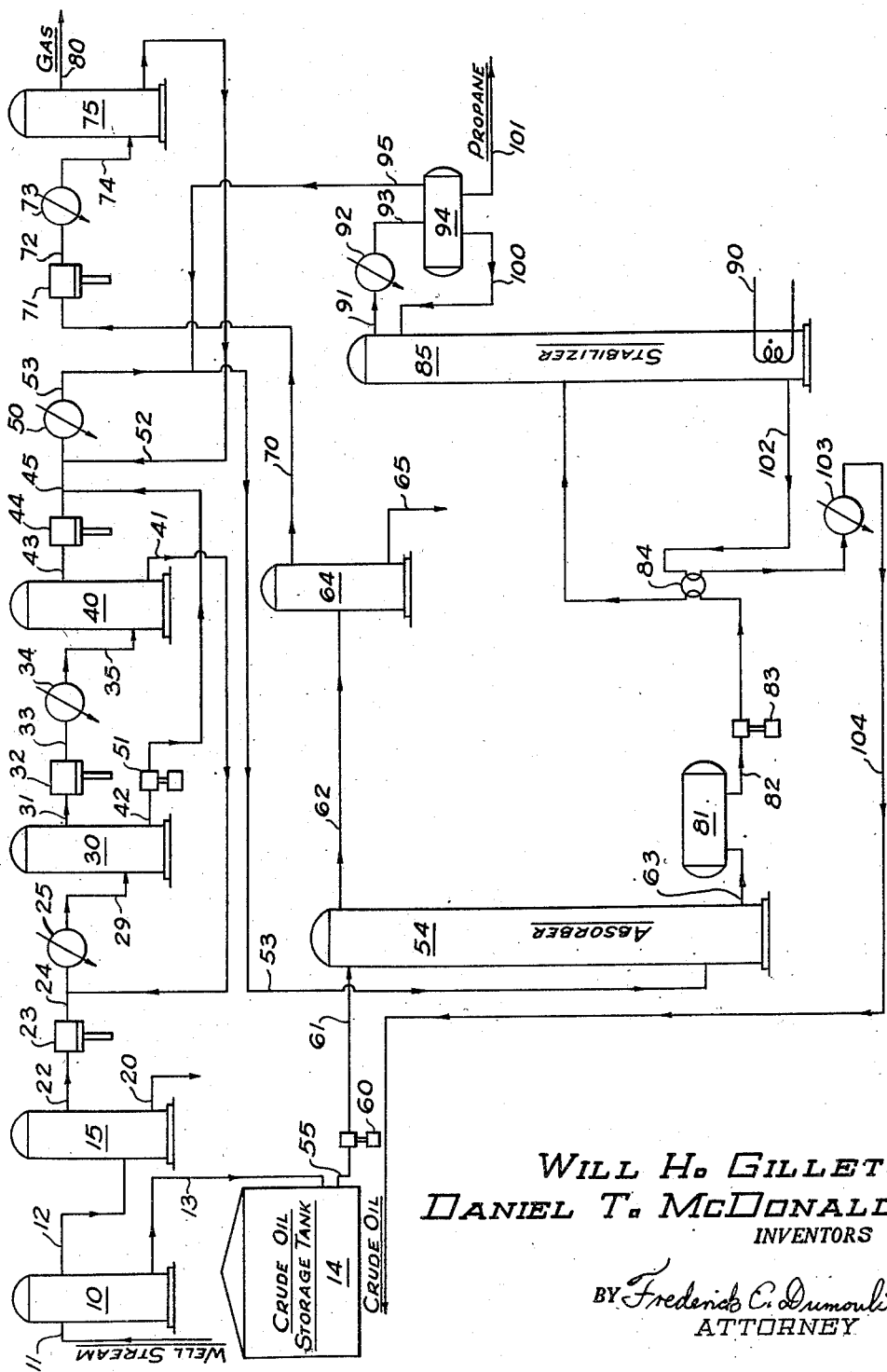

2,821,502

TREATMENT OF WELL FLUIDS

Will H. Gillett and Daniel T. McDonald, Dallas, Tex., assignors, by mesne assignments, to Socony Mobil Oil Company, Inc., New York, N. Y., a corporation of New York Application April 20, 1953, Serial No. 349,722

3 Claims. (Cl. 196—8)

This invention relates to the treatment of well fluids and relates more particularly to a process for the treatment of an effluent from petroleum wells containing both gas and oil.

Many petroleum wells produce an effluent consisting of gas and crude liquid petroleum oil. The gas and oil are separated, usually at or near the well head, and the crude petroleum oil is shipped, usually through a pipeline, to a refinery for processing into various petroleum products including gasoline. The separated gas contains various light hydrocarbon components, including butanes and pentanes which find use as gasoline components, propane which finds use as liquefied petroleum gas, and ethane and methane which find use as fuel gas or as petroleum oil reservoir pressuring mediums.

It is an object of this invention to provide a method for the treatment of effluents containing gas and oil from petroleum wells. It is another object of this invention to provide a method for obtaining in the oil phase gasoline hydrocarbon components of the gas phase of the effluent from a petroleum well producing both gas and oil. It is another object of this invention to provide a method for economically separating gasoline components from the gas phase of a petroleum well effluent containing both gas and oil. Further objects of the invention will become apparent from the following description thereof.

The single figure is a flow sheet schematically illustrating a preferred procedure for treating a petroleum well stream in accordance with the invention.

In accordance with the invention, the gas phase and the oil phase of the effluent from a petroleum well or wells containing both gas and crude petroleum oil are separated from each other in a separation zone to form a gas stream and an oil stream, thereafter the gas stream and the oil stream are contacted with each other in a contact zone under conditions of temperature and pressure compared to the conditions of temperature and pressure in the separation zone such that greater gas solubility is favored, the gas stream and the oil stream are again separated, the oil stream is stabilized to remove undesired light hydrocarbons, and the oil stream is shipped to a refinery for processing as desired. By the process of the invention, the gasoline hydrocarbon components of the gas phase are dissolved in the crude oil and the gasoline hydrocarbon components are shipped along with the crude oil to a refinery where the gasoline hydrocarbon components of the gas phase of the well effluent are available for admixture with the gasoline produced by processing of the crude oil.

The conditions of temperature and pressure in the contact zone compared to the conditions of temperature and pressure in the separation zone such that greater gas solubility is favored are obtained, preferably, by carrying out the contacting of the gas stream and oil stream in the contacting zone at a pressure higher than the pressure existing in the separation zone at the time the gas stream was separated from the oil stream but at a temperature comparable to the temperature existing in the separation zone at the time the gas stream was separated from the oil stream. If desired, the contacting of the oil and gas streams may be carried out in the contacting zone at a temperature lower than the temperature existing in the separation zone at the time the gas stream was separated from the oil stream and at a higher pressure than the pressure existing in the separation zone at the time the gas stream was separated from the oil stream. Alternately, the contacting of the gas and oil streams may be carried out in the contacting zone at a lower temperature than the temperature existing in the separation zone at the time the gas stream was separated from the oil stream but at the same pressure existing in the separation zone at the time the gas stream was separated from the oil stream. It is also possible to carry out the contacting of the gas and oil streams in the contacting zone at a higher pressure and at a higher temperature than the pressure and temperature existing in the separation zone at the time the gas stream was separated from the oil stream. In carrying out the latter procedure, the pressure must be sufficiently higher than the pressure existing in the separation zone at the time the gas stream was separated from the oil stream to overcome the effect of the higher temperature in the contacting zone decreasing the solubility of the gas in order that an overall increase in the solubility of the gas is obtained. Similarly, the contacting of the gas and oil streams may be carried out at a lower pressure and at a lower temperature than the pressure and temperature existing in the separation zone but the temperature must be sufficiently lower to overcome the effect of the lower pressure decreasing the solubility of the gas.

Referring now to the drawing, a mixture of gas and crude petroleum oil comprising the effluent from a petroleum well or wells producing both gas and petroleum oil enters separator 10 through line 11. For purposes of describing the procedure illustrated in the drawing, it will be assumed that the mixture of gas and crude petroleum oil is at a pressure of about 15 pounds per square inch absolute and at a temperature between about 70° F. and 90° F. The gas is separated from the oil in the separator 10 and the gas is removed from the separator as a separate stream through line 12 while the oil is removed from the separator as a separate stream through line 13 and passed to crude oil storage tank 14. The gas stream is passed through line 12 to separator 15 which is maintained at a pressure of about 10 pounds per square inch gage and any crude oil carried over by the gas stream from separator 10 settles to the bottom of the separator from which it is removed at intervals through line 20.

The gas stream is passed out from the top of separator 15 through line 22 and is compressed in compressor 23 to a pressure of about 13 pounds per square inch gage. The gas stream is then passed through line 24 to cooler 25 wherein the gas is cooled to a temperature of about 80° F. and the gas is next passed through line 29 to separator 30. Liquid hydrocarbons condensed from the gas as a result of its compression and cooling in compressor 23 and cooler 25 are separated from the gas in separator 30 and the gas is removed from the separator through line 31. The gas is compressed to a pressure of about 76 pounds per square inch gage in compressor 32 and it is then passed through line 33 to cooler 34 wherein it is cooled to a temperature of about 80° F., after which it is passed through line 35 to separator 40 where liquid hydrocarbons condensed therefrom as a result of compression and cooling in compressor 32 and cooler 34, respectively, are separated from the gas.

The liquid hydrocarbons separated from the gas in separator 40 contain dissolved therein, because of the pressure in the separator, a quantity of light hydrocarbon components such as methane and ethane which increase the vapor pressure of the liquid. In order to decrease the vapor pressure of the liquid hydrocarbons and for purposes of economy in pumping, the liquid is removed from separator 40, passed through line 41, and admixed with the gas stream in line 24. The gas stream in line 24 is at a lower pressure than the liquid hydrocarbon stream in line 41 and the light hydrocarbons in the liquid stream, as a result of the lowering of the pressure thereon, flash from the liquid stream and form part of the gas stream leaving separator 30. The liquid hydrocarbons condensed from the mixture of the liquid stream from line 41 and the gas stream from line 24 are removed from the bottom of separator 30 through line 42.

The gas separated from the liquid hydrocarbons in separator 40 is removed from the separator through line 43 and is compressed in compressor 44 to a pressure of about 293 pounds per square inch gage after which it is passed through line 45 to cooler 50. The liquid hydrocarbons from separator 30 are pumped through line 42 by pump 51 to join the gas stream in line 45 and the combined gas and liquid streams, along with the liquid stream entering line 45 through line 52 from a source to be described later, are cooled to a temperature of about 80° F. The combined streams then pass through the line 53 to the base of absorber 54 wherein the pressure is maintained at about 285 pounds per square inch gage. Crude oil leaves storage tank 14 through line 55 and is pumped by means of pump 60 through line 61 to the top of the absorber 54.

The gas portion of the mixed gas and liquid hydrocarbon stream entering the absorber 54 through line 53 consists primarily of methane, ethane, propane, and a small amount of butanes, and the gaseous portion separates from the liquid portion at the base of the absorber and flows upwardly through the absorber. The crude oil entering the absorber through line 61 flows downwardly through the absorber and countercurrently contacts the upwardly flowing gas stream. The gas and crude oil mixture entering separator 10 is at a pressure of about 15 pounds per square inch absolute and at a temperature between about 70° F. and 90° F., as previously mentioned, and separation is effected in the separator 10 at this pressure and temperature. In the absorber 54, the pressure is about 285 pounds per square inch gage and the temperature is about 80° F., and accordingly the downwardly flowing stream of crude oil absorbs from the upwardly flowing stream of gas a substantial amount of the propane and almost all of the butanes and heavier hydrocarbons contained therein as well as a portion of the methane and the ethane. The unabsorbed gas passes out of the absorber through line 62 and the crude oil containing the absorbed hydrocarbons and admixed with the liquid hydrocarbons entering the absorber through line 53 leaves the absorber through line 63.

The gas leaving the absorber through line 62 is passed to scrubber 64 maintained at a pressure of about 285 pounds per square inch gage where any crude oil entrained in the upwardly flowing stream of gas in the absorber 54 is removed therefrom. This crude oil is removed from the scrubber 64 at intervals through line 65 and the gas leaves the scrubber through line 70. A small amount of propane and heavier hydrocarbons are unabsorbed in the crude oil flowing downwardly in absorber 54 and to recover these hydrocarbons from the gas, the gas in line 70 is compressed in compressor 71 to a pressure of about 1030 pounds per square inch gage, passed through line 72, and cooled in cooler 73 to a temperature of about 80° F. whereby all but an insignificant portion of the butanes and heavier hydrocarbons are condensed. The cooled stream is passed through line 74 to separator 75 wherein the condensed hydrocarbons separate from the gas. The gas consisting substantially entirely of methane and ethane leaves the separator through line 80 and may be employed for repressuring of a subterranean petroleum oil reservoir, as a fuel gas after dehydration, or may be employed otherwise as desired. The liquid hydrocarbons containing propane and heavier hydrocarbons are passed through line 52 from the bottom of the separator 75 and recycled to the absorber 54 through line 53.

The crude petroleum oil leaving the bottom of absorber 54 through line 63 enters surge tank 81 and leaves the surge tank through line 82, and is pumped by means of pump 83 through heat exchanger 84 to stabilizer 85. The stabilizer 85 is provided with reboiler 90 and the oil is heated in the stabilizer to vaporize the propane and lighter hydrocarbons therefrom. The vaporized overhead is passed out of the stabilizer through line 91, is cooled in condenser 92 to condense the propane, and is passed through line 93 to reflux accumulator 94. The uncondensed portion of the vaporized overhead from the stabilizer contains a small amount of propane and the uncondensed overhead is passed through line 95 and recycled to the absorber 54 through line 53. A portion of the condensed propane is returned to the stabilizer 85 as reflux through line 100 and the remainder is withdrawn through line 101 for sale as liquefied petroleum gas or utilized otherwise as desired. The stabilized crude oil containing dissolved therein butanes and heavier hydrocarbons contained in the gas portion of the mixture entering the separator 10 through line 11 is removed from the stabilizer through line 102, is passed through heat exchanger 84 where it is partially cooled by indirect heat exchange with the oil entering the stabilizer through line 82, and is passed through cooler 103 where it is cooled to approximately atmospheric temperature. The cooled oil leaving the cooler through line 104 may then be shipped to a petroleum oil refinery.

The above-described process is intended to be merely illustrative of the invention and various changes may be made without departing from the scope of the invention. For example, while the gas and oil mixture entering the separator is described as being at a pressure of about 15 pounds per square inch absolute and at a temperature between about 70° F. and 90° F., it will be understood that the gas and oil mixture entering the separator may be at other pressures and other temperatures. Further, while three stages of compression and cooling of the gas prior to contacting with the crude oil are described, a greater or lesser number of stages may be employed, and the gas may be brought to a greater or lesser pressure for contact with the crude oil compared to its pressure when separated from the crude oil in the first separator. Additionally, while the contacting of the gas and oil in absorber 54 and stabilization of the crude oil containing the dissolved gas in stabilizer 85 is carried out to provide a crude oil product from the stabilizer containing butanes and heavier hydrocarbons and substantially free of propane and lighter hydrocarbons, the contacting and stabilizing may be carried out to provide a crude oil product from the stabilizer containing pentanes and heavier hydrocarbons and substantially free of butanes and lighter hydrocarbons. Also, the gas stream in line 95 instead of being admixed with the stream in line 53 may be subjected to a separate stage of absorption with crude oil or may be subjected to recompression.

Having thus described our invention, it will be understood that such description has been given by way of illustration and example and not by way of limitation, reference for the latter purpose being had to the appended claims.

We claim:

1. A process of treating the effluent from a petroleum well producing both gas and crude liquid petroleum oil comprising passing said effluent containing gas and crude liquid petroleum oil to a first separating zone, separating gas from crude liquid petroleum oil in said first separating zone, removing crude liquid petroleum oil as a separate stream from said first separating zone, removing gas as a separate stream from said first separating zone, increasing the pressure on said last mentioned gas in a first compression stage, passing said last mentioned gas from said first compression stage to a first cooling zone, cooling said last mentioned gas in said first cooling zone, removing cooled gas and liquid from said first cooling zone, passing said cooled last mentioned gas and liquid to a second separating zone, separating gas from liquid in said second separating zone, removing liquid as a separate stream from said second separating zone, removing gas as a separate stream from said second separating zone, increasing the pressure on said last mentioned gas in a second compression stage, passing said last mentioned gas from said second compression stage to a second cooling zone, cooling said last mentioned gas in said second cooling zone, removing cooled gas and liquid from said second cooling zone, passing said last mentioned cooled gas and liquid to a third separating zone, separating gas from liquid in said third separating zone, removing liquid as a separate stream from said third separating zone, admixing said last mentioned liquid with said gas passed to said first cooling zone from said first compression stage, cooling said last mentioned liquid in said first cooling zone, removing gas as a separate stream from said third separating zone, increasing the pressure on said last mentioned gas in a third compression stage, passing said last mentioned gas from said third compression stage to a third cooling zone, cooling said last mentioned gas in said third cooling zone, admixing said liquid removed as a separate stream from said second separating zone with said last mentioned gas passed to said third cooling zone from said third compression stage, cooling said last mentioned liquid in said third cooling zone, removing cooled gas and liquid from said third cooling zone, passing said last mentioned cooled gas and liquid to a contacting zone, passing said crude liquid petroleum oil removed as a separate stream from said first separation zone to said contacting zone, contacting said last mentioned gas with said last mentioned crude liquid petroleum oil in said contacting zone under conditions of temperature and pressure compared with conditions of temperature and pressure in said first separating zone that greater gas solubility in said crude liquid petroleum oil is favored, removing said last mentioned gas as a separate stream from said contacting zone, removing said last mentioned crude liquid petroleum oil as a separate stream from said contacting zone, stabilizing said last mentioned crude liquid petroleum oil, recovering said stabilized crude liquid petroleum oil, and shipping said stabilized crude liquid petroleum oil through a pipe line to a petroleum oil refinery.

2. A process of treating the effluent from a petroleum well producing both gas and crude liquid petroleum oil comprising passing said effluent containing gas and crude liquid petroleum oil to a first separating zone, separating gas from crude liquid petroleum oil in said first separating zone, removing crude liquid petroleum oil as a separate stream from said first separating zone, removing gas as a separate stream from said first separating zone, increasing the pressure on said last mentioned gas in a first compression stage, passing said last mentioned gas from said first compression stage to a first cooling zone, cooling said last mentioned gas in said first cooling zone, removing cooled gas and liquid from said first cooling zone, passing said last mentioned cooled gas and liquid to a second separating zone, separating gas from liquid in said second separating zone, removing liquid as a separate stream from said second separating zone, removing gas as a separate stream from said second separating zone, increasing the pressure on said last mentioned gas in a second compression stage, passing said last mentioned gas from said second compression stage to a second cooling zone, cooling said last mentioned gas in said second cooling zone, removing cooled gas and liquid from said second cooling zone, passing said last mentioned cooled gas and liquid to a third separating zone, separating gas from liquid in said third separating zone, removing liquid as a separate stream from said third separating zone, admixing said last mentioned liquid with said gas passed to said first cooling zone from said first compression stage, cooling said last mentioned liquid in said first cooling zone, removing gas as a separate stream from said third separating zone, increasing the pressure on said gas in a third compression stage, passing said last mentioned gas from said third compression stage to a third cooling zone, cooling said last mentioned gas in said third cooling zone, admixing said liquid removed as a separate stream from said second separating zone with said last mentioned gas passed to said third cooling zone from said third compression stage, cooling said last mentioned liquid in said third cooling zone, removing cooled gas and liquid from said third cooling zone, passing said last mentioned cooled gas and liquid to a contacting zone, passing said crude liquid petroleum oil removed as a separate stream from said first separation zone to said contacting zone, contacting said last mentioned gas with said last mentioned crude liquid petroleum oil in said contacting zone under conditions of temperature and pressure compared with conditions of temperature and pressure in said first separating zone that greater gas solubility in said crude liquid petroleum oil is favored, removing said last mentioned gas as a separate stream from said contacting zone, increasing the pressure on said last mentioned gas in a fourth compression stage, passing said last mentioned gas from said fourth compression stage to a fourth cooling zone, cooling said last mentioned gas in said fourth cooling zone, removing cooled gas and liquid from said fourth cooling zone, passing said last mentioned cooled gas and liquid to a fourth separating zone, separating gas from liquid in said fourth separating zone, removing gas as a separate stream from said fourth separating zone, removing liquid as a separate stream from said fourth separating zone, admixing said last mentioned liquid with said gas passed to said third cooling zone from said third compression stage, cooling said last mentioned liquid in said third cooling zone, removing said last mentioned crude liquid petroleum oil as a separate stream from said contacting zone, passing said last mentioned crude liquid petroleum oil to a stabilizing zone, stabilizing said last mentioned crude liquid petroleum oil in said stabilizing zone, removing gas as a separate stream from said stabilizing zone, passing said last mentioned gas to a fifth cooling zone, cooling said last mentioned gas in said fifth cooling zone, removing cooled gas and liquid from said fifth cooling zone, passing said last mentioned cooled gas and liquid to a fifth separating zone, separating gas from liquid in said fifth separating zone, removing liquid as a separate stream from said fifth separating zone, re-cycling at least a portion of said last mentioned liquid as reflux to said stabilizing zone, removing gas as a separate stream from said fifth separating zone, admixing said last mentioned gas with said cooled gas and liquid passed to said contacting zone, removing stabilized crude liquid petroleum oil from said stabilizing zone, and shipping said stabilized crude liquid petroleum oil through a pipe line to a petroleum oil refinery.

3. A process of treating the effluent from a petroleum well producing both gas and crude liquid petroleum oil comprising passing said effluent containing gas and crude liquid petroleum oil to a first separating zone, separating gas from crude liquid petroleum oil in said first separating zone, removing crude liquid petroleum oil as a separate stream from said first separating zone, removing gas as a separate stream from said first separating zone, increasing the pressure on said last mentioned gas in a first compression stage to about 13 pounds per square inch gage, passing said last mentioned gas from said first compression stage to a first cooling zone, cooling said last mentioned gas in said first cooling zone to a temperature of approximately 80° F., removing cooled gas and liquid from said first cooling zone, passing said cooled gas and liquid to a second separating zone, separating gas from liquid in said second separating zone, removing liquid as a separate stream from said second separating zone, removing gas as a separate stream from said second separating zone, increasing the pressure on said last mentioned gas in a second compression stage to a pressure of about 76 pounds per square inch gage, passing said last mentioned gas from said second compression stage to a second cooling zone, cooling said last mentioned gas in said second cooling zone to a temperature of approximately 80° F., removing cooled gas and liquid from said second cooling zone, passing said last mentioned cooled gas and liquid to a third separating zone, separating gas from liquid in said third separating zone, removing liquid as a separate stream from said third separating zone, admixing said last mentioned liquid with said gas passed to said first cooling zone from said first compression stage, cooling said last mentioned liquid in said first cooling zone to a temperature of approximately 80° F., removing gas as a separate stream from said third separating zone, increasing the pressure on said gas in a third compression stage to a pressure of about 293 pounds per square inch gage, passing said last mentioned gas from said third compression stage to a third cooling zone, cooling said last mentioned gas in said third cooling zone to a temperature of approximately 80° F., admixing said liquid removed as a separate stream from said second separating zone with said last mentioned gas passed to said third cooling zone from said third compression stage, cooling said last mentioned liquid in said third cooling zone to a temperature of approximately 80° F., removing cooled gas and liquid from said third cooling zone, passing said last mentioned cooled gas and liquid to a contacting zone, passing said crude liquid petroleum oil removed as a separate stream from said first separating zone to said contacting zone, contacting said last mentioned gas with said last mentioned crude liquid petroleum oil in said contacting zone at a temperature of approximately 80° F. and a pressure of about 285 pounds per square inch gage, removing said last mentioned gas as a separate stream from said contacting zone, increasing the pressure on said last mentioned gas in a fourth compression stage to a pressure of about 1030 pounds per square inch gage, passing said last mentioned gas from said fourth compression stage to a fourth cooling zone, cooling said last mentioned gas in said fourth cooling zone to a temperature of approximately 80° F., removing cooled gas and liquid from said fourth cooling zone, passing said last mentioned cooled gas and liquid to a fourth separating zone, separating gas from liquid in said fourth separating zone, removing gas as a separate stream from said fourth separating zone, removing liquid as a separate stream from said fourth separating zone, admixing said last mentioned liquid with said gas passed to said third cooling zone from said third compression stage, cooling said last mentioned liquid in said third cooling zone to a temperature of approximately 80° F., removing said last mentioned crude liquid petroleum oil as a separate stream from said contacting zone, passing said last mentioned crude liquid petroleum oil to a stabilizing zone, stabilizing said last mentioned crude liquid petroleum oil in said stabilizing zone, removing gas as a separate stream from said stabilizing zone, passing said last mentioned gas to a fifth cooling zone, cooling said last mentioned gas in said fifth cooling zone, removing cooled gas and liquid from said fifth cooling zone, passing said last mentioned cooled gas and liquid to a fifth separating zone, separating gas from liquid in said fifth separating zone, removing liquid as a separate stream from said fifth separating zone, re-cycling at least a portion of said last mentioned liquid as reflux to said stabilizing zone, removing gas as a separate stream from said fifth separating zone, admixing said last mentioned gas with said cooled gas and liquid passed to said contacting zone, removing stabilized crude liquid petroleum oil from said stabilizing zone, and shipping said stabilized crude liquid petroleum oil through a pipe line to a petroleum oil refinery.

References Cited in the file of this patent

UNITED STATES PATENTS

| | | |
|---|---|---|
| 2,138,218 | Raigorodsky | Nov. 29, 1938 |
| 2,286,453 | Angell | June 16, 1942 |
| 2,327,187 | Hill | Aug. 17, 1943 |
| 2,663,669 | Barnes | Dec. 12, 1953 |